US009928785B2

(12) United States Patent
Sanders et al.

(10) Patent No.: US 9,928,785 B2
(45) Date of Patent: Mar. 27, 2018

(54) TWO WAY DISPLAY FOR TWO-IN-ONE CONVERTIBLE COMPUTER FORM FACTORS

(71) Applicant: Google Inc., Mountain View, CA (US)

(72) Inventors: Nicholas Jordan Sanders, Saratoga, CA (US); Derek Basehore, Mountain View, CA (US)

(73) Assignee: Google LLC, Mountain View, CA (US)

(*) Notice: Subject to any disclaimer, the term of this patent is extended or adjusted under 35 U.S.C. 154(b) by 50 days.

(21) Appl. No.: 15/014,219

(22) Filed: Feb. 3, 2016

(65) Prior Publication Data
US 2017/0221424 A1 Aug. 3, 2017

(51) Int. Cl.
G09G 5/00 (2006.01)
G09G 3/34 (2006.01)
G02F 1/167 (2006.01)
G09G 3/20 (2006.01)
G06F 1/16 (2006.01)

(52) U.S. Cl.
CPC ............ G09G 3/344 (2013.01); G02F 1/167 (2013.01); G06F 1/1616 (2013.01); G06F 1/1647 (2013.01); G09G 3/2003 (2013.01); G09G 2320/0686 (2013.01)

(58) Field of Classification Search
CPC .... G09G 3/344; G09G 3/3446; G09G 3/3453; G09G 3/004; G09G 3/3466; G06F 1/1613; G06F 1/1615
USPC ............................ 345/1.1, 3.1, 107, 111, 905
See application file for complete search history.

(56) References Cited

U.S. PATENT DOCUMENTS

| 6,603,457 | B1* | 8/2003 | Nakanishi | G02F 1/167 |
| | | | | 345/105 |
| 6,704,133 | B2 | 3/2004 | Gates et al. | |
| 8,174,489 | B2 | 5/2012 | Sorensson et al. | |
| 8,362,992 | B2 | 1/2013 | Kuhlman et al. | |
| 8,411,069 | B1 | 4/2013 | Huang | |
| 2003/0020999 | A1 | 1/2003 | Tsujimura et al. | |
| 2006/0244880 | A1 | 11/2006 | Onishi et al. | |
| 2007/0194308 | A1* | 8/2007 | Kuo | H01L 27/3267 |
| | | | | 257/40 |

(Continued)

FOREIGN PATENT DOCUMENTS

WO 2015/010363 A1 1/2015

OTHER PUBLICATIONS

Combined Search and Examination Report for GB Patent Application No. GB1621604.6, dated Jun. 9, 2017, 6 pages.

Primary Examiner — Jennifer Nguyen
(74) Attorney, Agent, or Firm — Brake Hughes Bellermann LLP

(57) ABSTRACT

In one general aspect, a computing device can include a base, and a lid coupled to the base. The lid can house a display section including a first side and a second side. The display section can include a display device having a first side and a second side. The first side of the display device can be located on the first side of the display section and the second side of the display device can be located on the second side of the display section. An enclosure can surround the display device. The enclosure can include a fluid, a plurality of particles suspended in the fluid, and a layer of circuitry disposed on a surface of the enclosure. The computing device can be configured to control movement of the particles within the fluid by applying an electric field to the layer of circuitry.

20 Claims, 12 Drawing Sheets

(56) References Cited

U.S. PATENT DOCUMENTS

| | | |
|---|---|---|
| 2008/0174718 A1 | 7/2008 | Ma et al. |
| 2008/0303982 A1 | 12/2008 | Jin et al. |
| 2011/0175805 A1 | 7/2011 | Rottler et al. |
| 2012/0050840 A1* | 3/2012 | Lim .................. G02F 1/167 359/296 |
| 2012/0050975 A1 | 3/2012 | Garelli et al. |
| 2013/0194528 A1 | 8/2013 | Wang et al. |
| 2013/0222442 A1 | 8/2013 | Gu et al. |
| 2015/0205037 A1 | 7/2015 | Hsiao et al. |
| 2015/0221283 A1 | 8/2015 | Jia et al. |

* cited by examiner

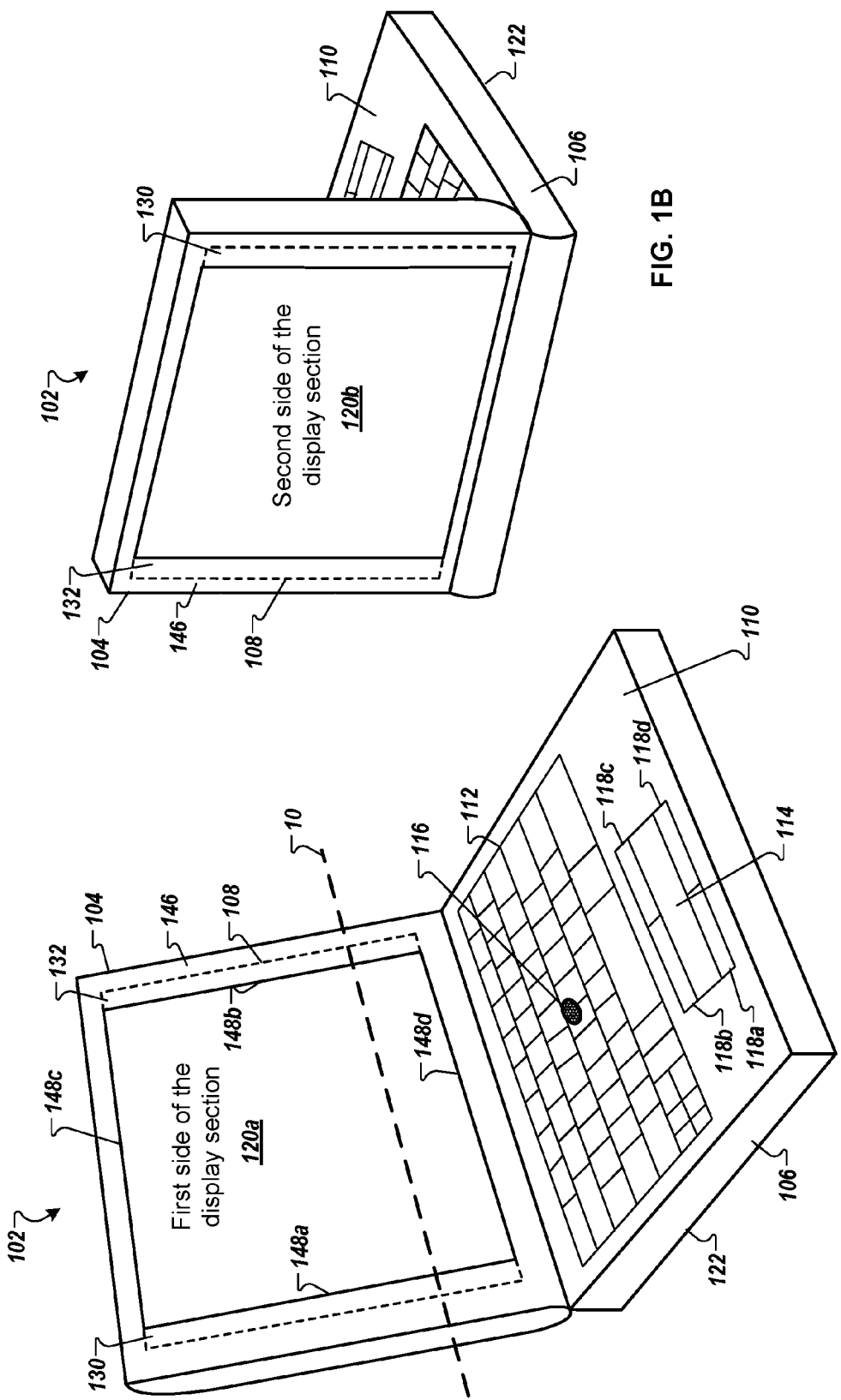

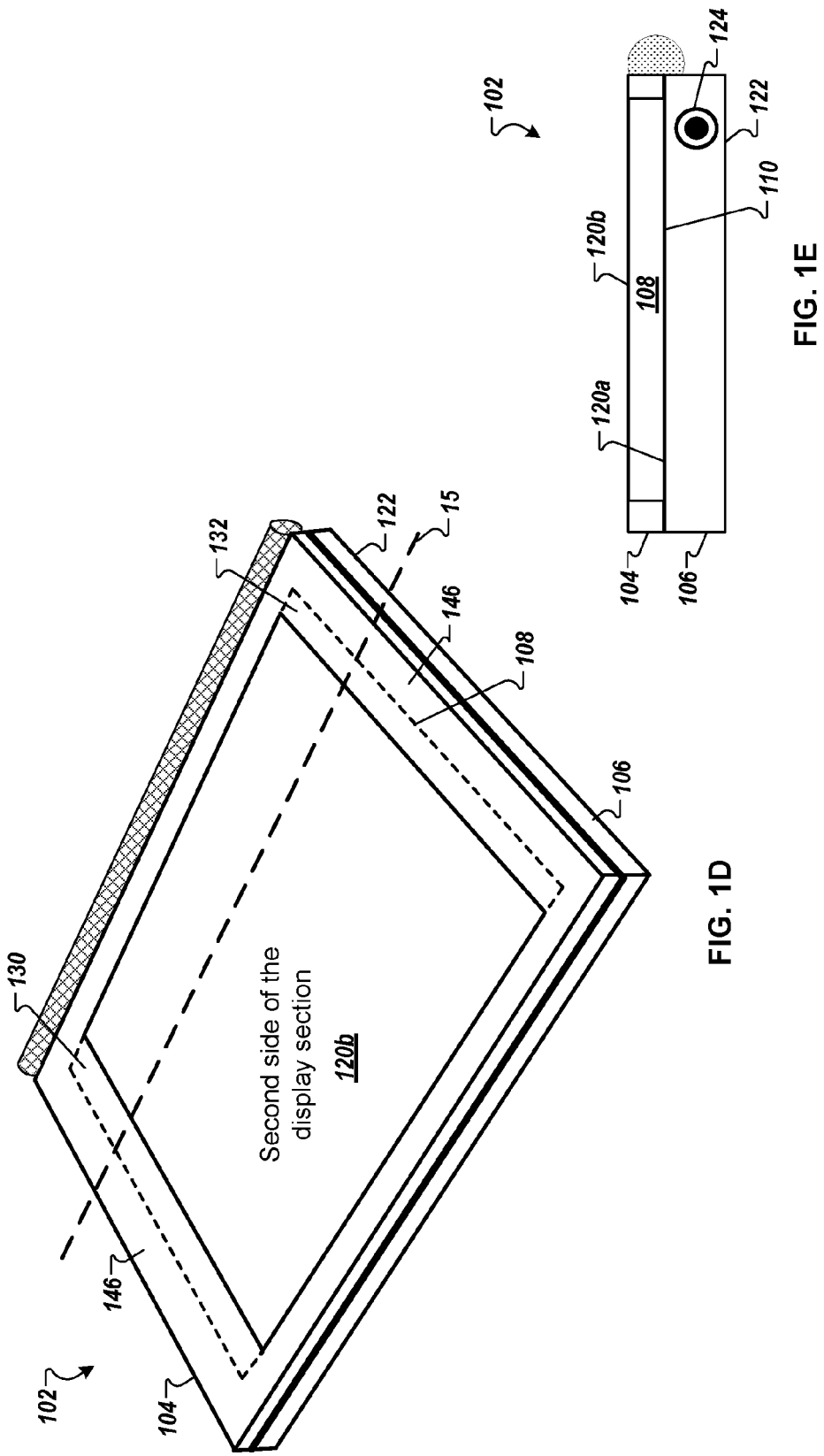

500

```
┌─────────────────────────────────────────────┐
│ Apply a positive charge to a plurality of   │
│ capacitors included in a first vertical bar │
│ of a plurality of vertical bars included in │
│ a layer of circuitry disposed on a surface  │
│ of an enclosure that surrounds a display    │
│ device.                              502    │
└─────────────────────────────────────────────┘
                      ↓
┌─────────────────────────────────────────────┐
│ Apply a negative charge to a plurality of   │
│ capacitors included in a second vertical    │
│ bar of the plurality of vertical bars.      │
│                                      504    │
└─────────────────────────────────────────────┘
                      ↓
┌─────────────────────────────────────────────┐
│ Apply a negative charge to a plurality of   │
│ capacitors included in a third vertical bar │
│ of the plurality of vertical bars.          │
│                                      506    │
└─────────────────────────────────────────────┘
                      ↓
┌─────────────────────────────────────────────┐
│ Move a first subset of a plurality of       │
│ particles suspended in a fluid included in  │
│ the enclosure away from the first vertical  │
│ bar and towards the second vertical bar.    │
│                                      508    │
└─────────────────────────────────────────────┘
                      ↓
┌─────────────────────────────────────────────┐
│ Move a second subset of the plurality of    │
│ particles away from the first vertical bar  │
│ and towards the third vertical bar.         │
│                                      510    │
└─────────────────────────────────────────────┘
```

FIG. 5

TWO WAY DISPLAY FOR TWO-IN-ONE CONVERTIBLE COMPUTER FORM FACTORS

TECHNICAL FIELD

This description generally relates to computing devices. The description, in particular, relates to display devices used in computing devices.

BACKGROUND

Computing devices (computing systems) can vary in shape and size, and can include laptop computers, netbook computers, and tablet computers. The computing devices can include a display device (e.g., an integrated monitor or touchscreen) among other elements, such as audio systems, wireless networking hardware, and user interface devices, such as keyboards and pointing devices. In some implementations, the display device of a computing device can be a touchscreen display that can also function as an input device.

A user may be able to use a computing device in multiple modes of operation. For example, the computing device can include a lid that houses the display device and a base that can include one or more input devices, such as a keyboard, a pointing stick, mouse buttons, a touchpad, and/or a trackpad. The lid can be attached to the base such that the lid can be moved and/or rotated with respect to the base so that the computing device can be placed into multiple positions. For example, in a closed position, the front of the lid of the computing device (the front of the touchscreen display) can face, and/or be in contact with, the top of the base of the computing device. In this position, the computing device can be used in a tablet mode if a user can interact with the side of the touchscreen display (the rear of the touchscreen display) not facing the base of the computing device. In some implementations, however, the lid that houses the display device may be constructed of an opaque material that could prevent a user from interacting with the computing device in a tablet mode when the computing device is placed in a closed position, even if the side of the touchscreen display (the rear of the touchscreen display) not facing the base of the computing device permitted such interactions.

In an open position, for example, a user of the computing device can view and interact with both the front of the touchscreen display and the input devices included in the base. An open position for the computing device can be where the lid of the computing device is placed out of contact with and in a stationary position with respect to the base of the computing device. For example, the lid can be placed at approximately a 130 degree angle with respect to the base. This example open position can be considered a laptop mode of operation for the computing device.

SUMMARY

In one general aspect, a computing device can include a base, and a lid coupled to the base. The lid can house a display section including a first side and a second side. The display section can include a display device having a first side and a second side. The first side of the display device can be located on the first side of the display section and the second side of the display device can be located on the second side of the display section. An enclosure can surround the display device. The enclosure can include a fluid, a plurality of particles suspended in the fluid, and a layer of circuitry disposed on a surface of the enclosure. The computing device can be configured to control movement of the particles within the fluid by applying an electric field to the layer of circuitry.

Implementations can include one or more of the following features, alone or in combination with one or more other features. For example, the layer of circuity can include a plurality of capacitors arranged in a plurality of vertical bars. The plurality of particles can include a plurality of positively charged opaque particles. The plurality of capacitors included in a vertical bar can be configured to repel the plurality of charged opaque particles when a positive charge is applied to the plurality of capacitors. The plurality of capacitors included in a vertical bar can be configured to attract the plurality of charged opaque particles when a negative charge is applied to the plurality of capacitors. The plurality of positively charged opaque particles can include a plurality of positively charged black particles. Controlling movement of the particles within the fluid by applying the electric field to the layer of circuitry can include applying a positive charge to a plurality of capacitors included in each of a plurality of first vertical bars, and applying a negative charge to a plurality of capacitors included in each of a plurality of second vertical bars. The plurality of positively charged black particles can be moved from the first side of the display section to the second side of the display section based on the applied positive charge and the applied negative charge. Content rendered on the first side of the display device can be configured for viewing from the first side of the display section. The second side of the display section can be opaque. The plurality of positively charged black particles can be composed of a reflective material. The plurality of positively charged black particles can reflect ambient light back through the display device. The reflecting can increase a perceived brightness of the content rendered on the first side of the display device. The lid can further include a bezel surrounding a perimeter of the lid. The enclosure can further include a first channel being located at a first edge of the display device and within the bezel, and a second channel being located at a second edge of the display device and within the bezel. The second edge of the display device can be opposite to the first edge of the display device. Controlling movement of the particles within the fluid by applying the electric field to the layer of circuitry can include controlling the movement of the plurality of particles into the first channel and the second channel.

In another general aspect, a method can include applying a positive charge to a plurality of capacitors included in a first vertical bar of a plurality of vertical bars included in a layer of circuitry disposed on a surface of an enclosure that surrounds a display device, applying a negative charge to a plurality of capacitors included in a second vertical bar of the plurality of vertical bars, the second vertical bar located adjacent to the first vertical bar, applying a negative charge to a plurality of capacitors included in a third vertical bar of the plurality of vertical bars, the third vertical bar located adjacent to the first vertical bar, moving a first subset of a plurality of particles suspended in a fluid included in the enclosure away from the first vertical bar and towards the second vertical bar, and moving a second subset of the plurality of particles away from the first vertical bar and towards the third vertical bar.

Implementations can include one or more of the following features, alone or in combination with one or more other features. For example, the plurality of particles can include a plurality of positively charged black particles. Moving the first subset of the plurality of particles away from the first vertical bar and towards the second vertical bar can include repelling, by the plurality of capacitors included in the first vertical bar, the first subset of the plurality of positively charged black particles, and attracting, by the plurality of capacitors included in the second vertical bar, the first subset of the plurality of positively charged black particles. Moving the second subset of the plurality of particles away from the first vertical bar and towards the third vertical bar can include repelling, by the plurality of capacitors included in the first vertical bar, the second subset of the plurality of positively charged black particles, and attracting, by the plurality of capacitors included in the third vertical bar, the second subset of the plurality of positively charged black particles. The negative charge can be applied to the plurality of capacitors included in the second vertical bar of the plurality of vertical bars while the positive charge can be applied to the plurality of capacitors included in the first vertical bar. The negative charge can be applied to the plurality of capacitors included in the third vertical bar of the plurality of vertical bars while the positive charge can be applied to a plurality of capacitors included in the first vertical bar. The method can further include applying a positive charge to the plurality of capacitors included in the first vertical bar, the second vertical bar, and the third vertical bar, applying a negative charge to a plurality of capacitors included in a fourth vertical bar of the plurality of vertical bars, the fourth vertical bar located adjacent to the second vertical bar, applying a negative charge to a plurality of capacitors included in a fifth vertical bar of the plurality of vertical bars, the fifth vertical bar located adjacent to the third vertical bar, moving the first subset of the plurality of particles away from the first vertical bar and the second vertical bar towards the fourth vertical bar, and moving the second subset of the plurality of particles away from the first vertical bar and the third vertical bar towards the fifth vertical bar. Moving the first subset of the plurality of particles can further include moving the first subset of the plurality of particles from a first side of the enclosure to a second side of the enclosure. Moving the second subset of the plurality of particles can further include moving the second subset of the plurality of particles from a first side of the enclosure to a second side of the enclosure. The plurality of particles can include a plurality of positively charged black particles. The method can further include rendering content on a first side of a display device included in the enclosure, the rendered content being viewable through the first side of the enclosure. The method can further include providing an opaque background for the content rendered on the display device. The opaque background can include the plurality of positively charged black particles. The plurality of positively charged black particles can be composed of a reflective material. The plurality of positively charged black particles included in the opaque background can reflect ambient light back through the display device. The reflecting can increase a perceived brightness of the content rendered on the first side of the display device.

In yet another general aspect, a non-transitory, machine-readable medium having instructions stored thereon, the instructions, when executed by a processor, can cause a computing device to apply, by the computing device, a positive charge to a plurality of capacitors included in a first vertical bar of a plurality of vertical bars included in a layer of circuitry disposed on a surface of an enclosure that surrounds a display device, apply a negative charge to a plurality of capacitors included in a second vertical bar of the plurality of vertical bars, the second vertical bar located adjacent to the first vertical bar, apply a negative charge to a plurality of capacitors included in a third vertical bar of the plurality of vertical bars, the third vertical bar located adjacent to the first vertical bar, move a first subset of a plurality of particles suspended in a fluid included in the enclosure away from the first vertical bar and towards the second vertical bar, and move a second subset of the plurality of particles away from the first vertical bar and towards the third vertical bar.

Implementations can include one or more of the following features, alone or in combination with one or more other features. For example, moving the first subset of the plurality of particles can further include moving the first subset of the plurality of particles into a first channel located at a first edge of the enclosure. Moving the second subset of the plurality of particles can further include moving the second subset of the plurality of particles into a second channel located at a second edge of the enclosure. The second edge of the enclosure can be opposite to the first edge of the enclosure.

The details of one or more implementations are set forth in the accompanying drawings and the description below. Other features will be apparent from the description and drawings, and from the claims.

BRIEF DESCRIPTION OF THE DRAWINGS

FIGS. 1A and 1B are diagrams that illustrate an example computing device in a laptop mode of operation.

FIGS. 1D and 1E are diagrams that illustrate an example computing device in a tablet mode of operation.

FIG. 5 is a flowchart that illustrates a method of operating a computing device that includes a two-sided display section.

Like reference symbols in the various drawings indicate like elements.

DETAILED DESCRIPTION

Figure 1C:
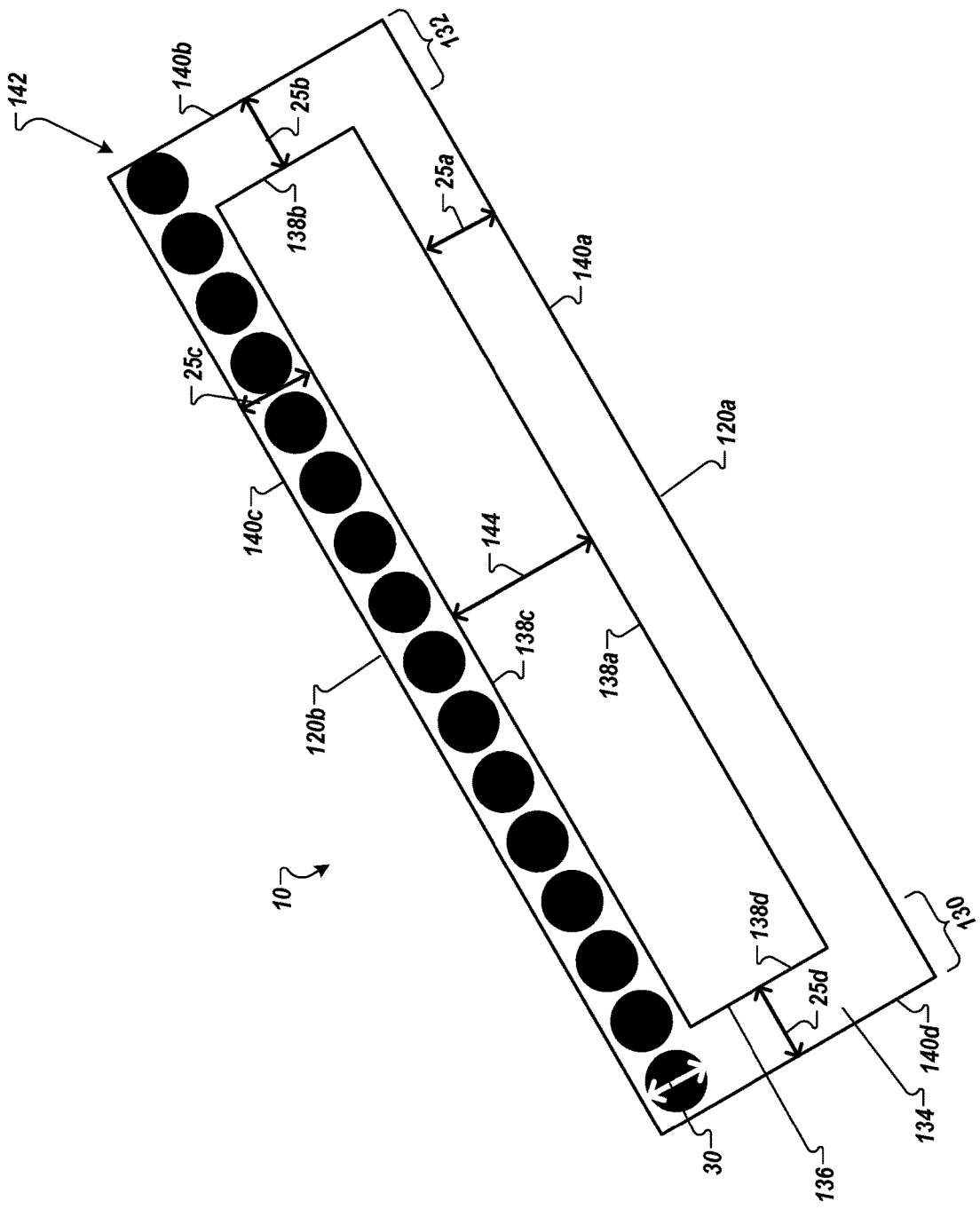
FIG. 1C is a diagram that illustrates a cross-section of a two-sided display section when a computing device is in a laptop mode of operation.

In some implementations, a lid of a computing device can be rotated so that the back of the lid contacts/faces the bottom of a base of a computing device (e.g., a 360 degree rotation of the lid from a closed position). The lid of the computing device can house (include) a display device that can be a touchscreen display that can also function as an input device. In this position, the computing device may also be used in a tablet mode of operation as a user can interact with the front of the touchscreen display.

In order for the lid to rotate 360 degrees with respect to the base of the computing device, however, one or more hinges used to couple the lid of the computing device to the base of the computing device need to be implemented accordingly. As computing devices become lighter, smaller, and thinner, it may be difficult to implement the one or more hinges to allow 360 degree rotation of the lid with respect to the base, while maintaining both the decreased size of the computing device and the ability of a user to operate the computing device in multiple modes (e.g., a tablet mode, a laptop mode).

In addition, when a user is interacting with the computing device in this tablet mode of operation, the top of the base of the computing device that can include one or more input devices, such as a keyboard, a pointing stick, mouse buttons, a touchpad, and/or a trackpad can be exposed. In some cases, in the tablet mode of operation, the computing device can be configured to disable any detected interactions with any of the one or more input devices to avoid any unwanted received input. However, the user may find it awkward and uncomfortable when interacting with the computing device in this tablet mode of operation with the one or more input devices being exposed and accessible.

Described herein is a two-way display device that can be incorporated into a computing device. A user of the computing device can view content rendered by the two-way display device on either side (and in some cases simultaneously on both sides) of the two-way display device. When viewed from a first side (the content-rendering side), a second side of the two-way display can become opaque, and, when viewed from the second side (the content-rendering side), the first side of the two-way display device can become opaque. The opaque side of the computing device can provide a uniform background behind the content-rendering side of the two-way display device. In some implementations, if the non-content rendering side of the two-way display device is transparent, a user viewing content from the content-rendering side of the two-way display device would be able to effectively "see through" the display, and view whatever may be behind the display (e.g., a keyboard, objects on a desk) at the time of the viewing.

The two-way display device can be incorporated into (included in) an enclosure (a sleeve, a pocket) that is made of a transparent material. The two-way display device placed within the enclosure can be incorporated into the computing device. The enclosure can contain a fluid within which a plurality of small, microscopic particles are suspended. The enclosure can surround and effectively enclose the two-way display device. For example, the enclosure can be a continuous sleeve or pocket that completely surrounds the two-way display device. In some implementations, the enclosure can be made of a clear plastic or other type of transparent or clear material.

In some implementations, a particle can be a positively charged black particle. When suspended within the fluid, the positively charged black particles can provide an opaque layer or cover over one or, in some cases, both sides of the two-way display device. Circuitry included in the enclosure can control the movement of the positively charged black particles within the fluid, controlling the resting location or position of the positively charged black particles within the fluid. By controlling the position or location of the positively charged black particles within the fluid, the circuitry can control which side of the two-way display device can be viewable (i.e., display content to the user) and which side of the two-way display device can be opaque (i.e., not display content to the user).

The enclosure can include a layer of circuitry that can create an electric field across the surface of the enclosure. The circuitry can include a plurality of capacitors arranged as bars (or lines) that can be either positively or negatively charged. In some implementations, the plurality of capacitors can be arranged as vertical bars. Charging the capacitors accordingly can move (or sweep) the positively charged black particles away from a first side of the two-way display device allowing the two-way display device to be viewed from the first side. The sweeping can be performed in a continuous manner beginning at the center of the first side of the two-way display device and continuing until all of the positively charged black particles are no longer suspended in the fluid that is located on the first side of the two-way display device.

The positively charged black particles can continue to be moved or swept away from the first side of the two-way display device around to a second side of the two-way display device. Moving (placing) the positively charged black particles on the second side of the two-way display device provides an opaque layer (an opaque mask) over the second side of the two-way display device. The second side of the two-way display device appears black to a user viewing the second side of the two-way display device. In addition, in some implementations, the positively charged black particles can be composed of a reflective material and may not necessarily be black particles. When the positively charged particles are placed on one side of the two-way display device (e.g., the second side) while the two-way display device is being viewed from the opposite side (e.g., the first side), the reflective properties of the positively charged particles can reflect light from the two-way display device back through the two-way display device, effectively increasing the perceived brightness of the two-way display device.

Power is consumed by the two-way display device when the positively charged black particles are being moved (swept or are in motion) within the enclosure. Once the positively charged black particles are placed in the desired position (e.g., they are moved (relocated) to a particular side of the two-way display device), the two-way display device no longer needs to provide power to maintain the positively charged black particles in the current position or state. In some cases, the particles can be gathered or swept into a border or well that is included on one or both sides of the enclosure that surrounds the two-way display device.

FIGS. 1A and 1B are diagrams that illustrate an example computing device 102 in a laptop mode of operation. The example computing device 102 includes a lid portion 104 and a base portion 106. The base portion 106 includes an input area 110. The input area 110 includes a keyboard 112, a trackpad 114, a pointer button 116, and mouse buttons 118*a*-*d*. For example, the computing device 102 can be placed on a surface where a bottom 122 of the base portion 106 rests on the surface while a user interacts with the input area 110 of the computing device 102.

The lid portion 104 includes a two-sided display section 108 that is part of (housed within/mounted in/encapsulated in) the lid portion 104 of the computing device 102. For example, the two-sided display section 108 can include a first side 120*a* and a second side 120*b*. The two-sided display section 108 can include a first edge 148*a*, a second edge 148*b*, a third edge 148*c*, and a fourth edge 148*d*.

FIG. 1C is a diagram that illustrates a cross-section 10 of a two-sided display section 108 when the computing device 102 is in a laptop mode of operation (e.g., the computing device 102 is in an open position). The cross-section 10 shows a two-way display device 136 (e.g., a two-way touch-sensitive display device, a two-way touchscreen) encapsulated in (enclosed in or incorporated into) an enclosure 134 (or sleeve) that surrounds the two-way display device 136. The two-way display device 136 has a width 144. The enclosure 134 includes a fluid within which particles 142 are suspended. The particles 142 can be positively charged black particles that are suspended in the fluid. In the example cross-section 10 shown in FIG. 1C, the particles 142 are all located on the second side 120*b* of the two-sided display section 108. In the example shown in FIG. 1C, the two-way display device 136 can be viewed from the first side 120*a* of the two-sided display section 108. The second side 120*b* of the two-sided display section 108 will appear opaque or black.

In the laptop mode of operation shown in FIGS. 1A, 1B, and 1C, content provided (rendered) on the two-way display device 136 can be viewed from the first side 120*a* of the two-sided display section 108. A user can interact with one or more input devices included in the input area 110 of the base portion 106 of the computing device 102 while viewing the rendered content. The opaque background provided by the second side 120*b* of the two-sided display section 108 can enhance the viewing of the content provided (rendered) on the first side 120*a* of the two-sided display section 108. The opaque second side 120*b* of the two-sided display section 108 provides privacy and hides what may be located behind the lid portion 104 of the computing device 102 from being seen (viewed) by the user of the computing device 102 as they view the content rendered by the two-way display device 136 on the first side 120*a* of the two-sided display section 108.

In some implementations, the positively charged black particles that are suspended in the fluid on the second side 120*b* of the two-sided display section 108 (e.g., the particles 142) can be composed of a reflective material and may not necessarily be black particles. In these implementations, the particles 142 can reflect light from the two-way display device 136 back through the two-way display device 136, effectively increasing the perceived brightness of the two-way display device 136 as viewed from the first side 120*a* of the two-sided display section 108. Referring to FIG. 1C, the enclosure 134 (or sleeve) that surrounds the two-way display device 136 can be made of a transparent or clear material (e.g., glass, bendable glass, plastic). The content rendered on (provided by) the two-way display device 136 can be viewed through the enclosure 134 and through the fluid included in the enclosure 134, and on the first side 120*a* of the two-sided display section 108.

FIGS. 1D and 1E are diagrams that illustrate the example computing device 102 in a tablet mode of operation. In the tablet mode of operation shown in FIGS. 1D and 1E, the computing device 102 is in a closed position. When the computing device 102 is in the closed position, the first side 120*a* of the two-sided display section 108 faces/contacts a top (e.g., the input area 110) of the base portion 106 of the computing device 102. As shown in FIGS. 1A and 1B, the top (e.g., the input area 110) of the base portion 106 of the computing device 102 can include one or more input devices such as the keyboard 112, the trackpad 114, the pointer button 116, and the mouse buttons 118*a-d*. In a tablet mode of operation, the second side 120*b* of the two-sided display section 108 can provide content for viewing by a user of the computing device 102, while the first side 120*a* of the two-sided display section 108 becomes opaque. The opaque first side 120*a* of the two-sided display section 108 can block or conceal the viewing of the input area 110 (e.g., the input devices included in the base portion 106 of the computing device 102) as the user views/interacts with the content displayed (rendered) by the two-way display device 136 on the second side 120*b* of the two-sided display section 108.

The computing device 102 can include a mode indication switch 124. The mode indication switch 124 can be a momentary push-button type switch. A user of the computing device 102 can press the mode indication switch 124 after closing the computing device 102 if the user intends to further use the computing device 102 in a tablet mode of operation.

Figure 1G:
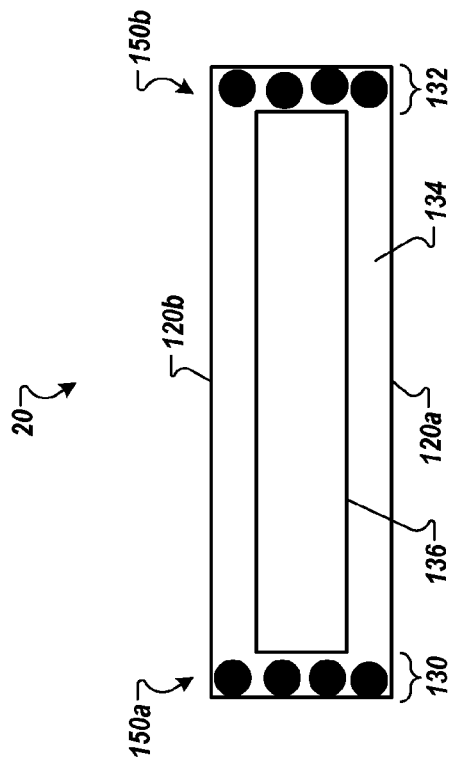
FIG. 1G is a diagram that illustrates a cross-section of a two-sided display section where particles are stored in a first channel and a second channel.
Figure 1F:
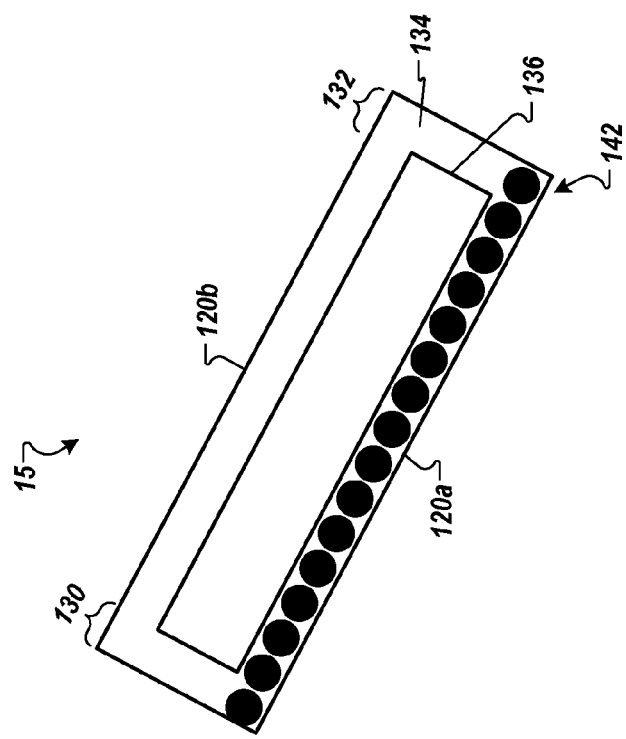
FIG. 1F is a diagram that illustrates a cross-section of a two-sided display section when a computing device is in a tablet mode of operation.

FIG. 1F is a diagram that illustrates a cross-section 15 of the two-sided display section 108 when the computing device 102 is in a tablet mode of operation. The cross-section 15 shows the two-way display device 136 (e.g., a two-way touch-sensitive display device, a two-way touchscreen) encapsulated in (enclosed in or incorporated into) the enclosure 134 (or sleeve) that surrounds the two-way display device 136. The enclosure 134 includes a fluid within which particles 142 are suspended. The particles 142 can be positively charged black particles that are suspended in the fluid. In the example cross-section 15 shown in FIG. 1F, the particles 142 are located (placed or positioned) on the first side 120*a* of the two-sided display section 108. In the example shown in FIG. 1F, the two-way display device 136 can be viewed from the second side 120*b* of the two-sided display section 108. The first side 120*a* of the two-sided display section 108 will appear opaque or black.

In the tablet mode of operation shown in FIGS. 1D, 1E, and 1F, content provided (rendered) on the two-way display device 136 can be viewed from the second side 120*b* of the two-sided display section 108. The opaque background provided by the first side 120*a* of the two-sided display section 108 can enhance the viewing of the content provided (rendered) on the second side 120*b* of the two-sided display section 108. The opaque first side 120*a* of the two-sided display section 108 can block or conceal the viewing of the input area 110 (e.g., the input devices included in the base portion 106 of the computing device 102) as a user views and/or interacts with the content displayed by the two-way display device 136 on the second side 120*b* of the two-sided display section 108.

In some implementations, the positively charged black particles that are suspended in the fluid on the first side 120*a* of the two-sided display section 108 (e.g., the particles 142) can be composed of a reflective material and may not necessarily be black. In these implementations, the particles 142 can reflect light from the two-way display device 136 back through the two-way display device 136, effectively increasing the perceived brightness of the two-way display device 136 as viewed from the second side 120*b* of the two-sided display section 108.

In some implementations, when the computing device is in a laptop mode of operation, software running on the computing device 102 can display content on the first side 120*a* of the two-sided display section 108. When the computing device 102 is in a tablet mode of operation, software running on the computing device 102 can display a mirror-image of the same content on the second side 120*b* of the two-sided display section 108. The mirror image ensures that content is orientated correctly (e.g., text is not displayed backwards).

FIG. 1G is a diagram that illustrates a cross-section 20 of the two-sided display section 108 where particles are stored or held in a first channel (or cavity) 130 and a second channel (or cavity) 132. Referring to FIGS. 1A-F, the two-sided display section 108 can include the first channel (or cavity) 130 and the second channel (or cavity) 132. In some cases, the cross-section 20 can be a cross-section of the two-sided display section 108 when the computing device 102 is in a tablet mode of operation (e.g., the computing device 102 is in a closed position). In some cases, the cross-section 20 can be a cross-section of the two-sided display section 108 when the computing device 102 is in a laptop mode of operation (e.g., the computing device 102 is in an open position).

In some implementations, the first channel 130 and the second channel 132 can be implemented to store or hold the positively charged black particles (e.g., particles 150a and particles 150b). The particles 150a-b can be swept away (moved or relocated) from the first side 120a of the two-sided display section 108 and from the second side 120b of the two-sided display section 108 allowing the two-way display device 136 to be viewed from both the first side 120a and the second side 120b.

As shown in FIGS. 1A-G, in some implementations, the first channel 130 and the second channel 132 can be located (positioned) under (within) a bezel 146 (a frame) included in the lid portion 104 of the computing device 102. The bezel 146 can surround a perimeter of the lid portion 104. For example, a user of the computing device 102 may not be able to see the first channel 130 and the second channel 132 while viewing content displayed on the first side 120a of the two-sided display section 108 and while viewing content displayed on the second side 120b of the two-sided display section 108 because the first channel 130 and the second channel are positioned inside of, under, or within the bezel 146.

Referring to FIGS. 1C, 1F, and 1G, in a first example, the particles 142 can be placed or positioned between the side 138c of the two-way display device 136 and the side 140c of the enclosure when the computing device 102 is in a laptop mode of operation. In this first example, referring to FIG. 1C, the particles 142 (e.g., positively charged black particles) provide an opaque black background for viewing of content rendered on the two-way display device 136 from the first side 120a of the two-sided display section 108. Because of the presence of the particles 142, the two-way display device 136 may not be viewed from the second side 120b of the two-way display device section 108.

In a second example, the particles 142 can be placed or positioned between the side 138a of the two-way display device 136 and the side 140a of the enclosure when the computing device 102 is in a tablet mode of operation. In this second example, referring to FIG. 1F, the particles 142 (e.g., positively charged black particles) provide an opaque black background for viewing of content rendered on the two-way display device 136 from the second side 120b of the two-sided display device section 108. Because of the presence of the particles 142, the two-way display device 136 may not be viewed from the first side 120a of the two-sided display device section 108.

In a third example, the particles 142 can be placed or positioned between the side 138d of the two-way display device 136 and the side 140d of the enclosure (in the first channel 130), and between the side 138b of the two-way display device 136 and the side 140b of the enclosure (in the second channel 132). In this third example, the particles 142 (e.g., positively charged black particles) are dispersed into the first channel 130 (e.g., as particles 150a) and the second channel 132 (as particles 150b). In this example, content rendered on the two-way display device 136 may be viewed from the first side 120a of the two-sided display section 108 and the second side 120b of the two-sided display section 108.

Referring to FIGS. 1C, 1F, and 1G in some implementations, the enclosure 134 can be located (placed) around the two-way display device 136 such that distances 25a-d between sides 138a-d of the two-way display device 136 and sides 140a-d of the enclosure 134 are equal. In some implementations, the enclosure 134 can be located (placed) around the two-way display device 136 such that distances 25a-d between sides 138a-d of the two-way display device 136 and sides 140a-d of the enclosure 134 are not equal. For example, distance 25a may be less than distance 25c, while distance 25b and distance 25d can be equal. In another example, distance 25c may be less than distance 25a, while distance 25b and distance 25d can be equal. In another example, distance 25a may be equal to 25c, while distance 25b is greater that distance 25d. In another example, distance 25a may be equal to 25c, while distance 25d is greater that distance 25b. Other examples and combination of distances may also be implemented.

The distances 25a-d, a material used for each of the particles 142, a diameter (e.g., diameter 30) of each of the particles 142, a material used for the enclosure 134, a fluid included in the enclosure 134, and a viscosity for the fluid can be determined based on many factors or criteria. For example, a user of the computing device 102 should be able to view content rendered on the two-way display device 136 from the first side 120a of the two-sided display section 108 and from the second side 120b of the two-sided display section 108 depending on an operating mode of the computing device 102. Therefore, the material for the enclosure 134 should be transparent to allow viewing of the two-way display device 136 through the enclosure 134. In addition, the fluid included in the enclosure 134 should be clear or transparent to allow viewing of the two-way display device 136 through the enclosure 134.

The distances 25a-d, the material used for each of the particles 142, a diameter (e.g., diameter 30) for each of the particles 142, and a viscosity for the fluid are determined based on how quickly and easily the computing device 102 (e.g., the two-sided display section 108) can move or sweep the particles 142 from one side of the two-sided display section 108 to the other side of the two-sided display section 108.

One consideration can be the amount of power the computing device 102 needs to provide the two-sided display section 108 in order to sweep or move the particles 142 from one side of the two-sided display section 108 to the other side of the two-sided display section 108. Movement of the particles 142 in the fluid in the enclosure 134 displaces the fluid in the enclosure 134. An amount of resistance from the fluid when a particle is moving in the fluid can be based on the square of the radius of the particle. Each of the distances 25a-d can be chosen to be larger than the diameter 30 for each particle 142. Making each of the distances 25a-d larger that the diameter 30 for each particle enables the particles 142 to move about freely in the fluid without becoming stuck to or against one another and, therefore, becoming unable to move.

The viscosity of the clear or transparent fluid can be selected to allow the particles 142, when they are not moving (when they are at rest) and when power is no longer being used by the two-sided display section 108 to sweep or move the particles 142, to remain in a current position (placement or location) the particles 142 are placed in. In addition or in the alternative, the viscosity of the clear or transparent fluid can be selected to allow easy and rapid movement of the particles 142 within the fluid so that the two-sided display section 108 can be placed in the correct mode based on the detected operating mode of the computing device 102.

In some implementations, particle diameters can be less than one micrometer. In one example, the particles 142 can be carbon black particles with a diameter of approximately 0.9 micrometers dispersed in mineral oil. Each of the distances 25*a-d* can be equal to approximately three micrometers. The width of the two-way display device 136 can be approximately two millimeters. The computing device 102 can apply power to the two-sided display section 108 for approximately four seconds in order to sweep (move) the particles 142 from the first side 120*a* of the two-sided display section 108 to the second side 120*b* of the two-sided display section 108. The application of power and the sweeping (movement) of the particles 142 can be initiated (triggered) based on detection by the computing device 102 of the computing device 102 being put in a laptop operation mode. For example, a switch in the computing device 102 can detect when the computing device 102 is in an opened position (e.g., the lid portion 104 of the computing device 102 can be placed at approximately a 130 degree angle with respect to the base portion 106).

In some implementations, a two-way display device can include two displays placed against one another (e.g., back-to-back liquid crystal display (LCD) modules where each LCD module includes backlighting). In these implementations, one display may display content while the other display remains effectively in an "off" state. In other cases, both displays may be placed on an "off" state. In other cases, both displays may display the same or similar content (e.g., a second display can display the mirror image of the content being displayed on the first display). A computing device that includes a two-way display device with two displays can be large, heavy and cumbersome. In some implementations, natural lighting may be used in place of backlighting for an LCD. However, when the computing device is placed in a tablet mode of operation (e.g., the front of the lid of the computing device faces/contacts the top of the base of the computing device), little if any natural lighting is available to effectively backlight the LCD.

In some implementations, a two-way display device can include a single display that can be viewed from both sides (e.g., an organic light emitting diode (OLED) display). An OLED display can include OLEDs configured in a particular pattern (e.g., an x-y grid) that emit light when a voltage is applied to a diode. The organic layers for the OLEDs can be patterned and deposited on a substrate that includes a backplane. The backplane can include switching and driving circuitry for the OLEDs. The substrate can be encapsulated, forming an OLED display.

In some implementations, the substrate can include a rigid, non-bendable material such as a rigid glass panel or a rigid plastic panel. In some implementations, the substrate can include a bendable material that can include, but is not limited to, plastic, metal, or flexible glass. OLED displays, dependent on the substrate, can be viewed from both the front and the back of the display. In some implementations, when a transparent substrate is used, the OLED display can be viewed from both sides. In these implementations, the OLED display may be referred to as a transparent OLED display. In other implementations, when an opaque substrate is used, the OLED display can be viewed from the side on which the OLEDs are deposited on the opaque substrate. In some implementations, a two-way display device can include a single OLED display that incorporates a transparent substrate. The OLED display can be viewed from both sides.

For example, the two-way display device 136 can be a single OLED display that incorporates a transparent substrate so that the OLED display can be viewed from both sides. A user can view content rendered on the two-way display device 136 from the first side 120*a* of the two-sided display section 108 and the second side 120*b* of the two-sided display section 108.

In some implementations, the two-way display device 136 can include a type of black mask. For example, an OLED display can use a black mask to cover (mask) circuitry included in the OLED display from being viewable when the OLED display is viewed. Because the particles 142 do not occupy the entire area of the two-sided display section 108 when covering a side of the the two-sided display section 108, an area or specific location in the two-sided display section 108 that does not include one or more particles 142 can include (reveal) the black mask. This can enable better black colors for the displaying on the two-way display device 136, in particular in the implementations where particles 142 are composed of a reflective material.

FIGS. 2A-H are diagrams that illustrate movement of charged particles suspended (dispersed) in a clear fluid included in an enclosure that surrounds a two-way display device. For example, the particles 142 can be positively charged black particles that are suspended in the clear fluid as discussed with reference to FIGS. 1A-G.

In some implementations, as shown in FIGS. 2A-G, the enclosure 134 can include circuitry shown as vertical bars 202*a-k* and vertical bars 204*a-k*. The circuitry can be laminated to (affixed to, disposed on) a surface of the enclosure 134. In some implementations, the spacing and number of charged vertical bars can be less than the number shown in FIGS. 2A-G. In some implementations, the spacing and number of charged vertical bars can be greater than the number shown in FIGS. 2A-G. The vertical bars 202*a-k* and vertical bars 204*a-k* are perpendicular to the direction of the cross-section 10 as shown in FIG. 1A.

The circuitry included in the vertical bars 202*a-k* and the vertical bars 204*a-k* can be charged accordingly to create an electric field that can sweep or move the positively charged black particles 142 from one side of the two-sided display section 108 to another side of the two-sided display section 108. For example, each vertical bar 202*a-k* and each vertical bar 204*a-k* can be a column of capacitors that can be charged and discharged.

Figure 2A:
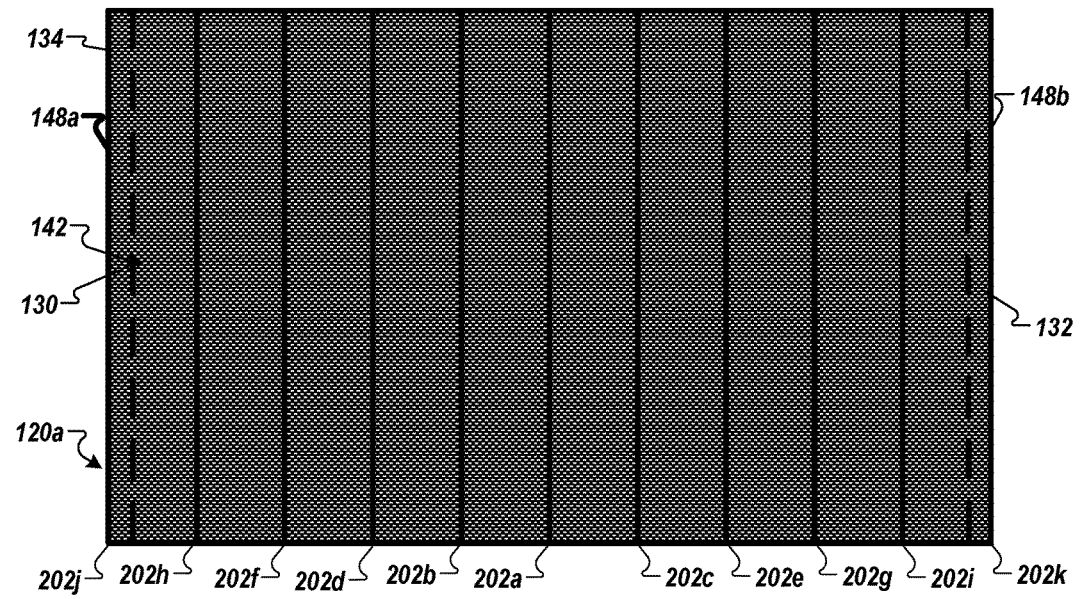
FIGS. 2A-H are diagrams that illustrate movement of charged particles suspended or dispersed in a clear fluid included in an enclosure that surrounds a two-way display device.
Figure 2B:
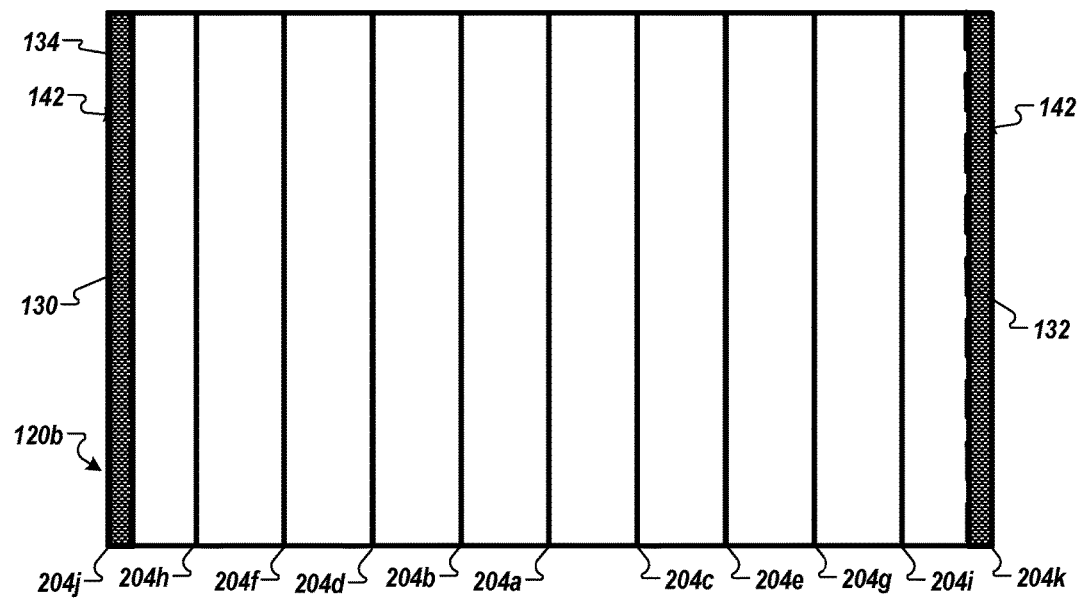
Figure 2C:
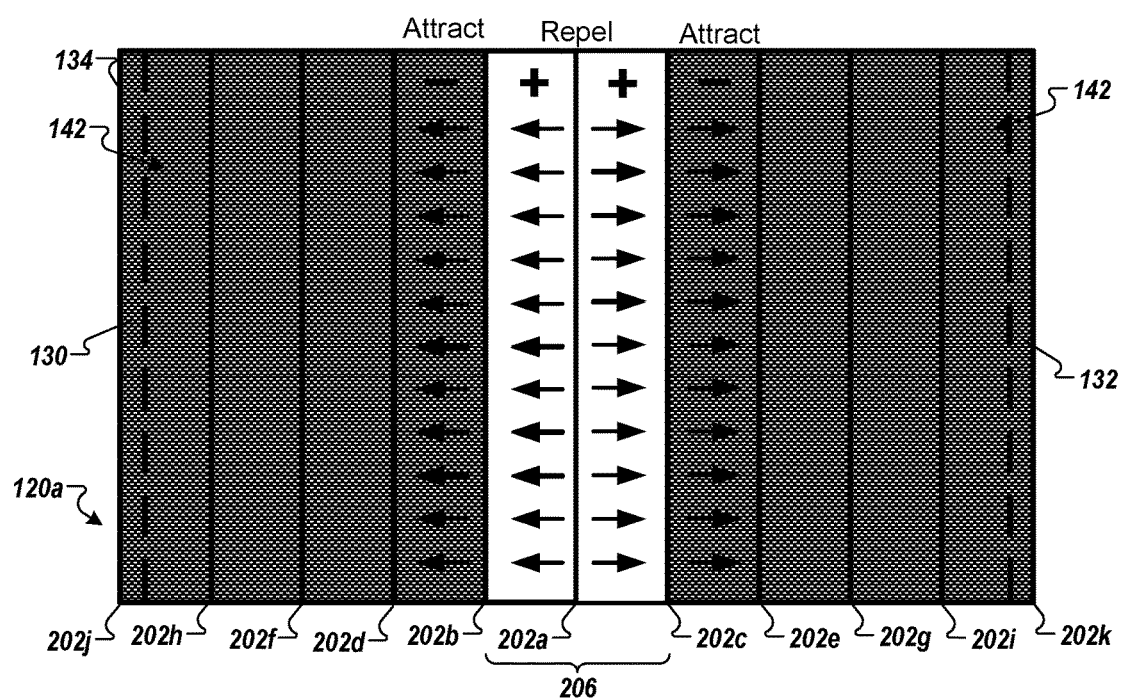
Figure 2D:
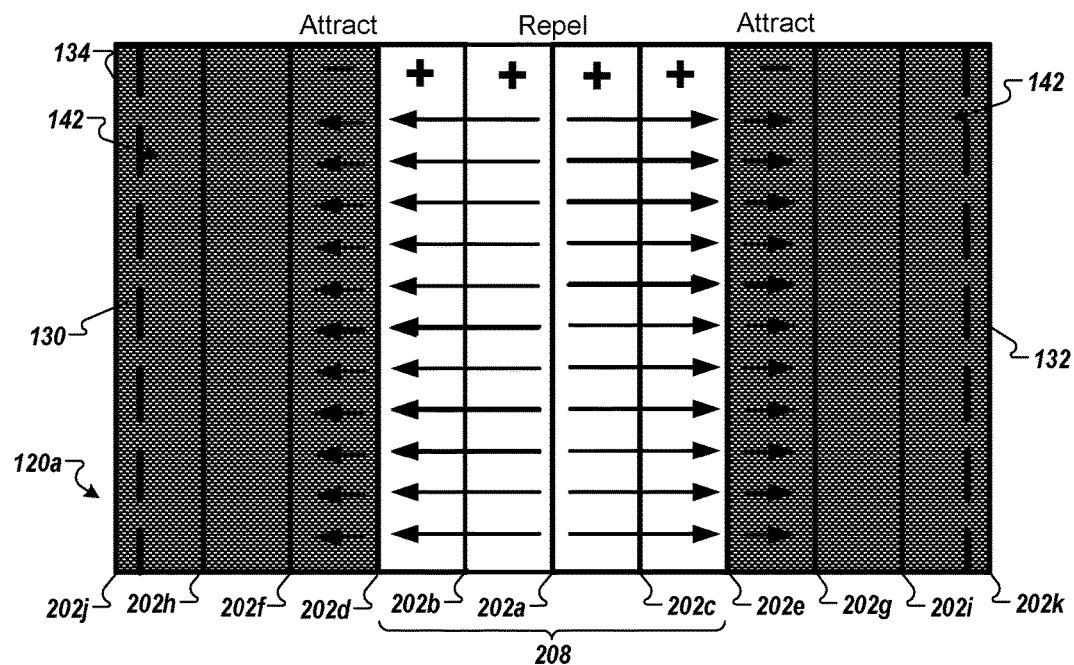
Figure 2E:
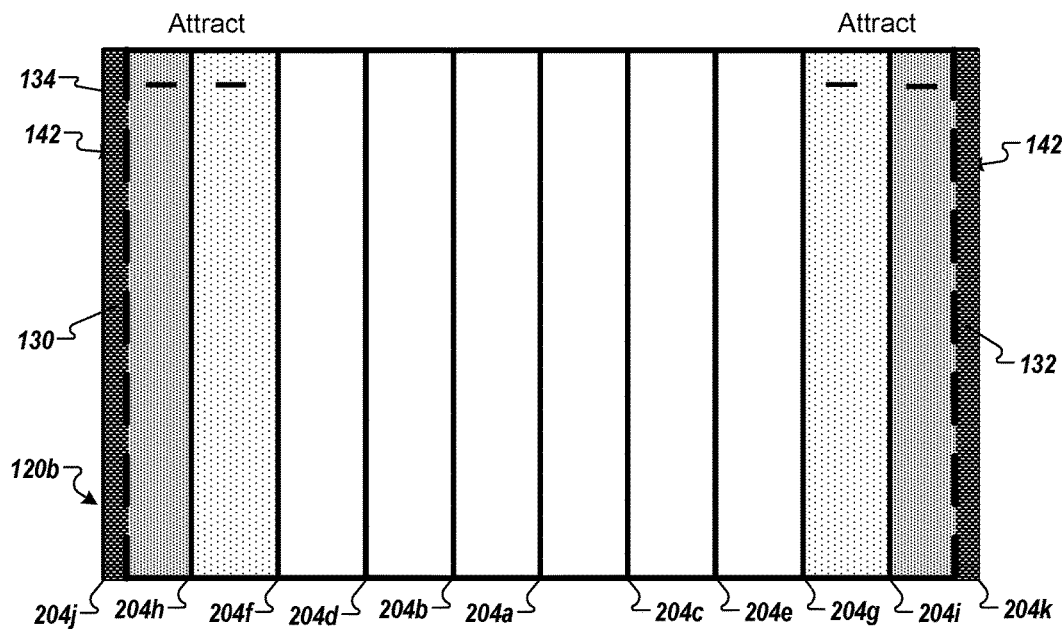
Figure 2F:
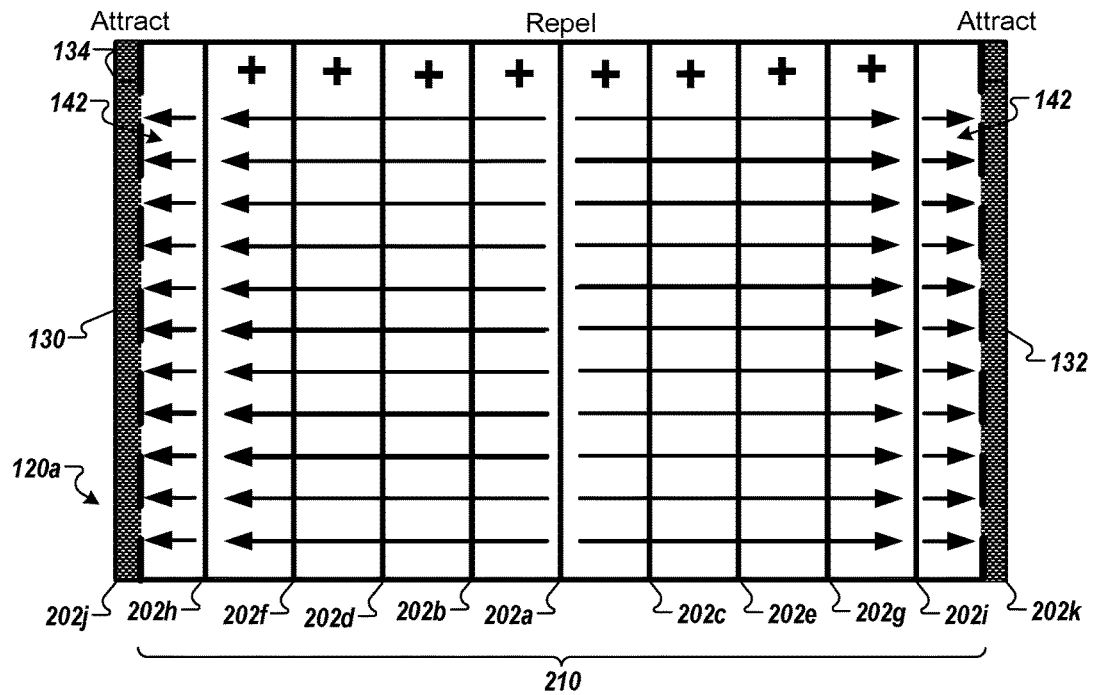
Figure 2G:
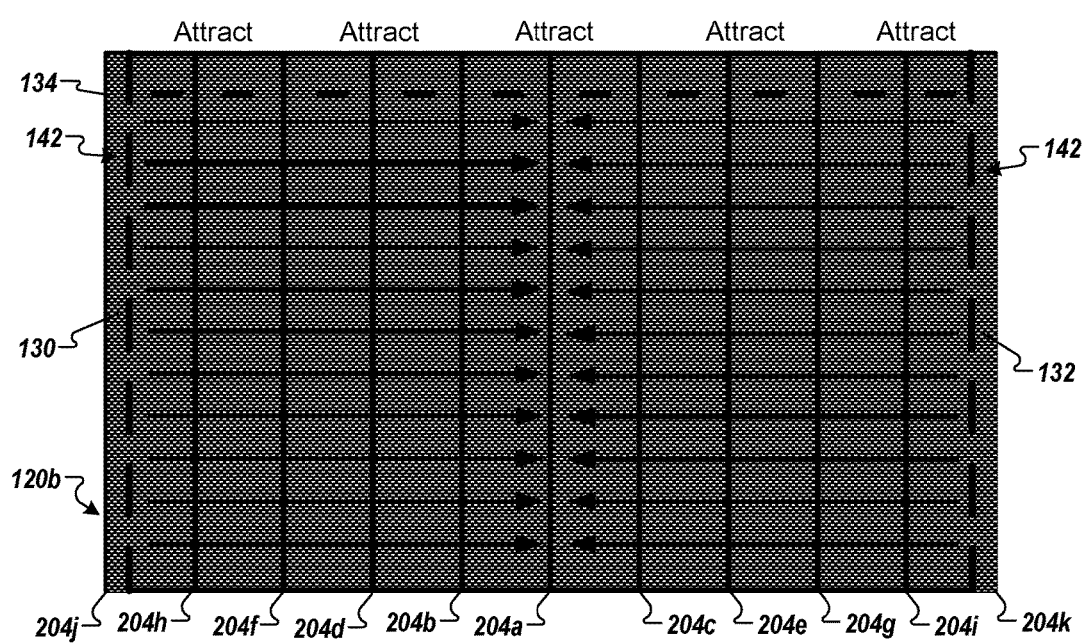
Figure 2H:
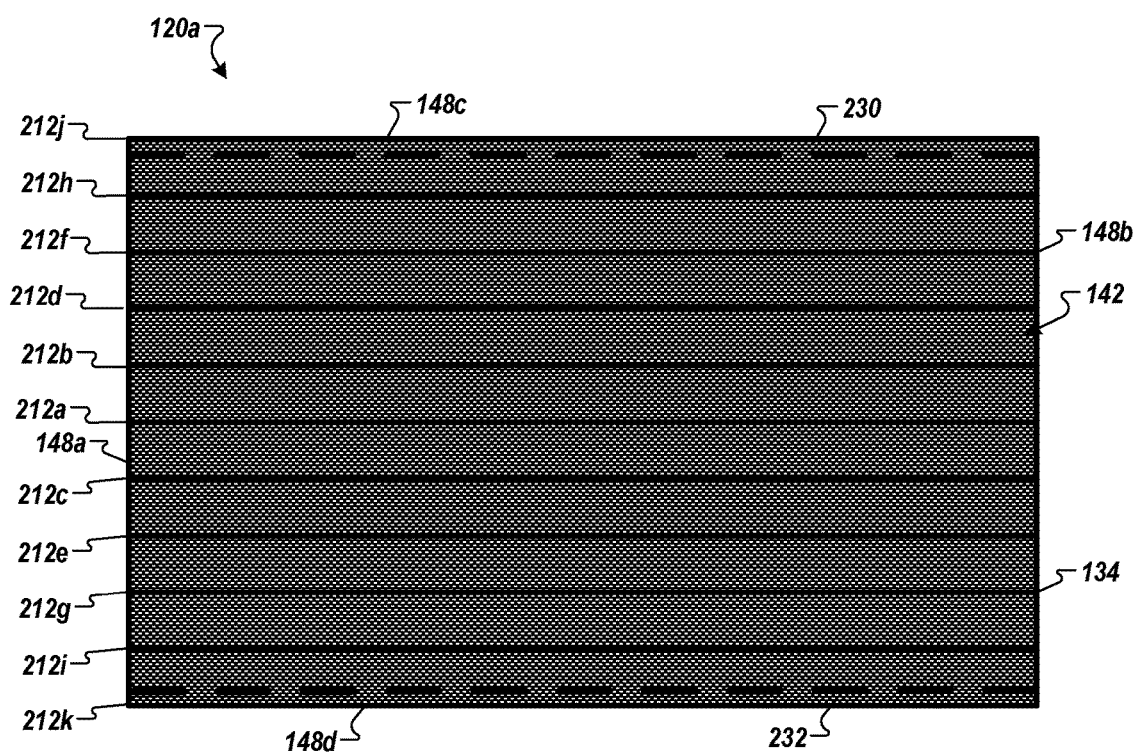

In some implementations, as shown in FIG. 2H, the enclosure 134 can include circuitry shown as horizontal bars 212*a-k* on the first side 120*a* of the two-sided display section 108. Though not shown, the enclosure 134 can include horizontal bars on the second side 120*b* of the two-sided display section 108 similar to the horizontal bars 212*a-k*. The circuitry can be laminated to (affixed to, disposed on) a surface of the enclosure 134. In some implementations, the spacing and number of charged horizontal bars can be less than the number shown in FIG. 2H. In some implementations, the spacing and number of charged horizontal bars can be greater than the number shown in FIG. 2H. The horizontal bars 212*a-k* are parallel to the direction of the cross-section 10 as shown in FIG. 1A.

The circuitry included in the horizontal bars 212*a-k* can be charged accordingly to create an electric field that can sweep or move the positively charged black particles 142 from one side of the two-sided display section 108 to another side of the two-sided display section 108. For example, each horizontal bar 212a-k can be a column of capacitors that can be charged and discharged. The horizontal bars of capacitors can perform and behave the same as the vertical bars of capacitors as described herein. The horizontal bars of capacitors can be charged and discharged accordingly in order to maintain, move, or relocate the positively charged black particles 142 between the first side 120a and the second side 120b of the two-sided display section 108. When horizontal bars are used, the positively charged black particles 142 are moved between the first side 120a and the second side 120b of the two-sided display section 108 using a third channel 230 and a fourth channel 232 located at the third edge 148c and the fourth edge 148d, respectively, of the two-sided display section 108. This is performed in a similar manner as the movement of the positively charged black particles 142, by the vertical bars, between the first side 120a and the second side 120b of the two-sided display section 108 using the first channel 130 and the second channel 132 located at the first edge 148a and the second edge 148b, respectively, of the two-sided display section 108.

Referring to FIG. 2A, not charging any of the column of capacitors included in each vertical bar 202a-k (not applying an electric field to the circuitry) can maintain the positively charged black particles 142 in suspension in the fluid that covers the first side 120a of the two-sided display section 108. Keeping the positively charged black particles 142 in suspension in the fluid that covers the first side 120a of the two-sided display section 108 blocks the viewing of any content rendered on the two-way display device 136 from the first side 120a of the two-sided display section 108. The viewing of any content rendered on the two-way display device 136 from the first side 120a of the two-sided display section 108 is blocked because the suspended positively charged black particles 142 provide an opaque cover over the first side 120a of the two-sided display section 108. The suspended positively charged black particles 142 provide, in effect, a closed curtain over the side 138a of the two-way display device 136.

In addition, referring to FIG. 2B, not charging any of the column of capacitors included in each vertical bar 204a-k (not applying an electric field to the circuitry) can maintain the positively charged black particles 142 in suspension in the fluid that covers the first side 120a of the two-sided display section 108 while not attracting any of the positively charged black particles 142 into the fluid that covers the second side 120b of the two-sided display section 108. The viewing of content rendered on the two-way display device 136 from the second side 120b of the two-sided display section 108 is not blocked, in effect, opening a curtain over the side 138c of the two-way display device 136.

For example, referring to FIGS. 1A-G, FIGS. 2A-B can represent a state of the two-sided display section 108 when the computing device 102 is in a tablet mode of operation. FIGS. 2C-G show the movement of the positively charged black particles 142 from being suspended in the fluid that covers the first side 120a of the two-sided display section 108 to being suspended in the fluid that covers the second side 120b of the two-sided display section 108 when the computing device is transitioned from a tablet mode of operation (a closed position) to a laptop mode of operation (an open position).

Referring to FIG. 2C, the column of capacitors included in the vertical bar 202a is positively charged. Applying a positive charge to the column of capacitors included in the vertical bar 202a repels (pushes, sweeps) positively charged black particles in the proximity of the vertical bar 202a away from the column of capacitors included in the vertical bar 202a. In addition, applying a negative charge to the column of capacitors included in the vertical bar 202b and the vertical bar 202c can attract (pull, gather) the positively charged black particles that are being repelled. As shown in FIG. 2C, the curtain over the first side 120a of the two-sided display section 108 has started to part, allowing a portion 206 of the two-way display device 136 to be viewed from the first side 120a of the two-sided display section 108. Because none of the column of capacitors included in each vertical bar 204a-k are charged (an electric field is not applied to the circuitry), the particles 142 do not yet migrate (move) second side 120b of the two-sided display section 108.

Referring to FIGS. 2B and 2C, and also to FIGS. 1A-G, many of the positively charged black particles (e.g., some of the particles 142) can be suspended not only partially in the fluid that covers the first side 120a of the two-sided display section 108 but also in fluid included in the first channel 130 and the second channel 132. In some implementations, one or more columns of capacitors arranged in vertical bars can be included in the first channel 130 (e.g., vertical bar 202j and vertical bar 204j). In addition or in the alternative, one or more columns of capacitors arranged in vertical bars can be included in the second channel 132 (e.g., vertical bar 202k and vertical bar 204k). When a change in an operating mode of the computing device 102 is detected, and that change includes movement of the particles 142 from being suspended in fluid that covers one side of the two-sided display section 108 to being suspended in fluid that covers the other side of the two-sided display section 108, each column of capacitors included in the first channel 130 and the second channel 132 can be negatively charged in order to attract the particles as they are pushed (swept) from one side of the two-sided display section 108. In these implementations, the first channel 130 and the second channel 132 can act as temporary storage or accumulation areas as the particles 142 are moved from being suspended in fluid that covers one side of the two-sided display section 108 to being suspended in fluid that covers the other side of the two-sided display section 108.

Referring to FIG. 2D, the column of capacitors included in the vertical bars 202a-c are positively charged. Applying a positive charge to the column of capacitors included in the vertical bars 202a-c further repels positively charged black particles in the proximity of the vertical bars 202a-c away from the column of capacitors included in the vertical bars 202a-c. In addition, applying a negative charge to the column of capacitors included in each of the vertical bars 202d and 202e can attract the positively charged black particles that are being repelled. As shown in FIG. 2D, the curtain over the first side 120a of the two-sided display section 108 has started to part, allowing a portion 208 larger than the portion 206 of the two-way display device 136 to be viewed from the first side 120a of the two-sided display section 108.

Referring to FIG. 2E, as the column of capacitors included in the vertical bars 202a-c are positively charged and the column of capacitors included in each of the vertical bars 202d and 202e are negatively charged, the column of capacitors included in the vertical bars 204f-i can be negatively charged, starting to attract and move the positively charged black particles that are being repelled from and moved away from the first side 120a of the two-sided display section 108 to the second side 120b of the two-way display device 136.

As a positive charge is applied to an increasing number of columns of capacitors included in the vertical bars 202a-k, the number of positively charged black particles that are repelled also increases. In addition, the acceleration of the positively charged black particles that are repelled also increases, increasing the velocity of the movement of the repelled positively charged black particles until the repelled positively charged black particles achieve a peak velocity. The repelled positively charged black particles will continue to move within the fluid at the peak velocity, being attracted by negatively charged columns of capacitors included in one or more vertical bars located on the first side 120a of the two-sided display section 108 and located in one or more vertical bars located on the second side 120b of the two-sided display section 108 until the electric field is no longer applied to the circuitry included in the enclosure 134. Once the electric field is no longer applied to the circuitry included in the enclosure 134, the movement of the positively charged black particles can stop (end), leaving the positively charged black particles in suspension in a location in the fluid (and in a location within the enclosure 134) determined when the electric field was removed.

Referring to FIG. 2F, the column of capacitors included in the vertical bars 202a-i are positively charged. Applying a positive charge to the column of capacitors included in the vertical bars 202a-i repels (pushes or sweeps away) the positively charged black particles 142 from the first side 120a of the two-sided display section 108. As shown in FIG. 2F, the curtain over the first side 120a of the two-sided display section 108 has completely parted, allowing a portion 210 larger than the portion 208 of the two-way display device 136 to be viewed from the first side 120a of the two-sided display section 108.

Referring to FIG. 2G, applying a negative charge to the column of capacitors included in each vertical bar 204a-k attracts the positively charged black particles 142 for suspension in the fluid that covers the second side 120b of the two-sided display section 108. Keeping the positively charged black particles 142 in suspension in the fluid that covers the second side 120b of the two-sided display section 108 blocks the viewing of any content rendered on the two-way display device 136 from the second side 120b of the two-sided display section 108. The viewing of any content rendered on the two-way display device 136 from the second side 120b of the two-sided display section 108 is blocked because the suspended positively charged black particles 142 provide an opaque cover over the second side 120b of the two-sided display section 108. The suspended positively charged black particles 142 provide, in effect, a closed curtain over the side 138c of the two-way display device 136.

Referring to FIGS. 2F and 2G, once the positively charged black particles 142 are suspended in the fluid that covers the second side 120b of the two-sided display section 108 and the curtain is parted over the first side 120a of the two-sided display section 108, content rendered on the two-way display device 136 can be viewed from the first side 120a of the two-sided display section 108 while the second side 120b of the two-sided display section 108 provides an opaque backing. The electrical field can be removed from the circuitry included in the enclosure 134. The particles 142 can remain suspended in the fluid as shown in FIGS. 2F and 2G, and the computing device 102 can be used (interacted with) in a laptop mode of operation.

Referring to FIG. 2F, the portion 210 of the two-way display device 136 that can be viewed is the largest portion of the two-way display device 136 that can be viewed in the two-sided display section 108. As shown in FIG. 2F and FIGS. 1A-G, the first channel 130 and the second channel 132 occupy an area along a side (e.g., side 138d and side 138b, respectively) of the two-way display device 136. In some implementations, the first channel 130 and the second channel 132 can be placed over each side (e.g., side 138d and side 138b, respectively) of the two-way display device 136, masking any content rendered in the area occupied by each of the first channel 130 and the second channel 132. A width of the first channel 130 (e.g., the distance 25d) and a width of the second channel 132 (e.g., the distance 25b) can combined occupy no more than ten percent of the surface area of the two-way display device 136. For example, the width of the first channel 130 (e.g., the distance 25d) can occupy five percent of the surface area of the two-way display device 136. The width of the second channel 132 (e.g., the distance 25b) can occupy five percent of the surface area of the two-way display device 136.

The number of capacitors included each vertical bar (e.g., the vertical bars 202a-k and the vertical bars 204a-k) can be determined based on an amount of energy or a power consumption that the computing device can provide verses a speed for moving the particles 142 as dispersed in the fluid from one side of the two-sided display section 108 to another side of the two-sided display section 108. For example, the greater the number of capacitors included in a vertical bar, the more energy or power that the computing device 102 needs to provide to the circuitry included in the enclosure 134 in order to generate the electric field needed to move the particles within the fluid. However, the greater the number of capacitors that are included in each vertical bar, the faster the particles 142 will move within the fluid.

A similar process as described with reference to FIGS. 2A-G can be performed when the computing device 102 transitions from a laptop mode of operation to a tablet mode of operation. In some implementations, referring to FIGS. 1A-E and in particular to FIG. 1E, a user can activate a mode indication switch 124. The user of the computing device 102 can press the mode indication switch 124 after closing the computing device 102 if the user intends to further use the computing device 102 in a tablet mode of operation. The closing of the computing device 102 along with the activation of the mode indication switch 124 can confirm putting the computing device 102 into a tablet mode of operation. The computing device 102 can provide energy and power to circuitry included in the enclosure 134 to control movement of the positively charged black particles within the fluid to provide an opaque background for the two-sided display section 108.

Figure 3A:
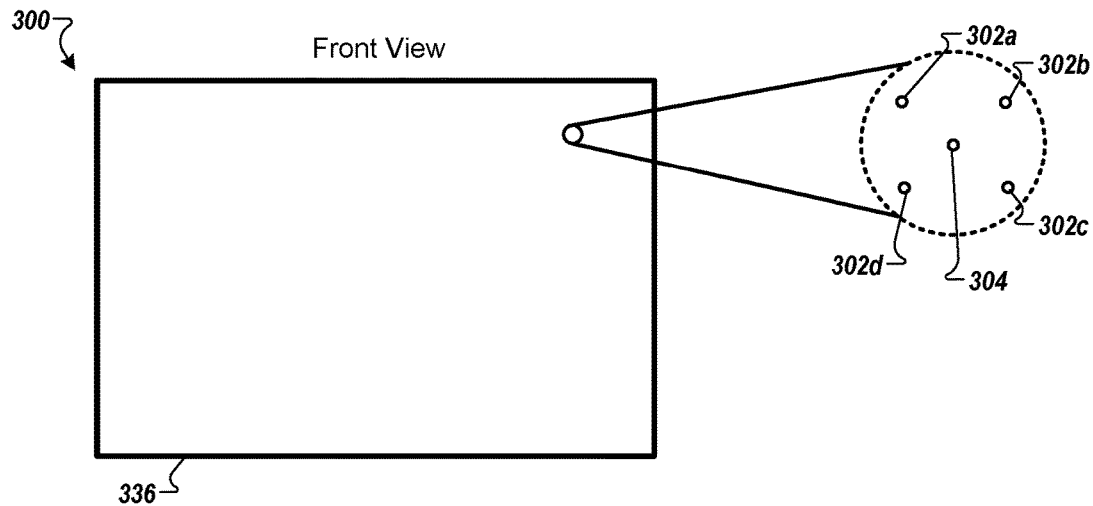
FIG. 3A is a diagram of a front view of a display device that shows an example of a small hole or perforation located in proximity to one or more pixels included in a two-way display device.

FIG. 3A is a diagram of a front view 300 of a display device 336 that shows an example of one of a plurality of small holes (perforations) (e.g., hole 304) located in proximity (e.g., in a circle around) to one or more pixels (e.g., pixels 303a-d) included in a two-way display device 336. For example, referring to FIGS. 1A, 1B, 1D, and 1E, the two-way display device 336 can be an OLED device that can be the two-way display device 136 included in the enclosure 134 that comprises the two-sided display section 108 for the computing device 102. Each hole (e.g., the hole 304) can be located near one or more pixels (e.g., the pixels 303a-d) that are part of the two-way display device 336.

When the computing device 102 is in a laptop mode of operation, the particles 142 (e.g., positively charged black particles) suspended in the fluid surrounding the two-way display device 336 can be repulsed by circuitry included in the side 140a of the enclosure 134 while being attracted by circuitry included in the side 140c of the enclosure 134. Alternatively, when the computing device 102 is in a tablet mode of operation, the particles 142 (e.g., positively charged black particles) suspended in the fluid surrounding the two-way display device 336 can be repulsed by circuitry included in the side 140c of the enclosure 134 while being attracted by circuitry included in the side 140a of the enclosure 134.

Figure 3B:
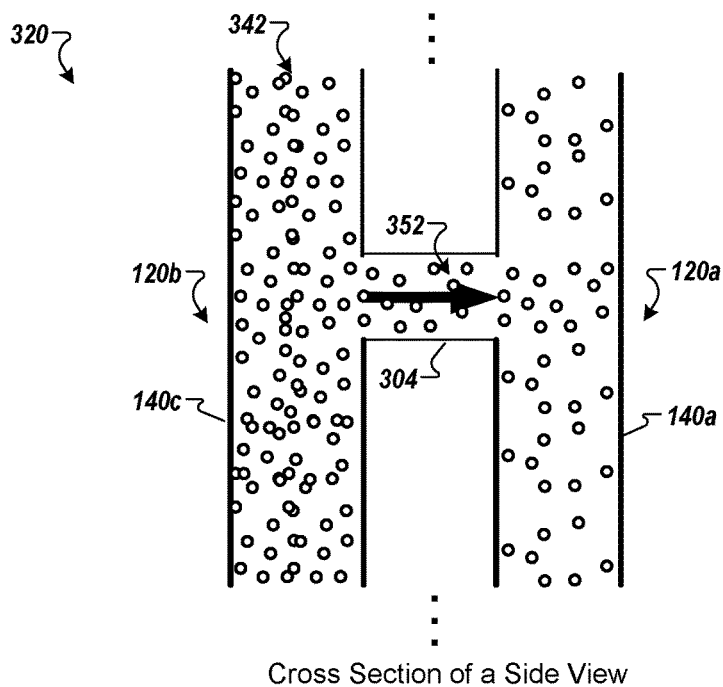
FIG. 3B is a diagram of a cross-section of a side view of a display device that shows an example a small hole or perforation included in a two-way display device.

FIG. 3B is a diagram of a cross-section of a side view 320 of the display device 336 that shows the example of one of the plurality of small holes (perforations) (e.g., hole 304) included in the two-way display device 336. As shown in the cross-section of a side view 320, the hole 304 can appear as a tube or a tunnel through the two-way display device 336. In order to facilitate the movement of the particles 142 between the first side 120a of the two-sided display section 108 and the second side 120b of the two-sided display section 108, the hole 304 will include fluid and the diameter of the particles 142 will be much less than (e.g., at least a factor of ten less than) the diameter of the hole 304.

In the example shown in FIG. 3B, particles 342 (e.g., positively charged black particles) are suspended in the fluid located on the second side 120b of the two-sided display section 108. Positively charged black particles 352 can be repulsed by circuitry included in the side 140b of the enclosure 134 while being attracted by circuitry included in the side 140a of the enclosure 134. The positively charged black particles 352 are drawn into the fluid included in the first side 120a of the two-sided display section 108 by passing through the hole 304 from the fluid located on the second side 120b of the two-sided display section 108.

In some implementations, a laser can drill holes in the two-way display device 336 that are approximately ten micrometers in diameter. The size of the particles 142 can be determined such that movement of the particles 142 from one side of the two-sided display section 108 to another side of the two-sided display section 108 can be accomplished by moving the particles 142 through the drilled holes. The speed of the movement of the particles 142 through the holes can be determined based on the number of drilled holes in the two-way display device 336, the size of the particles 142, the diameter of the holes, and the attractive and repellant forces provided by the circuitry included in the sides (e.g., the side 140a and the side 140c) of the enclosure 134. For example, the particles 142 can move faster between the first side 120a of the two-sided display section 108 and the second side 120b of the two-sided display section 108 if more holes are included in the two-way display device 336, if the diameter of the holes is larger, if the size of the particles are properly determined based on the diameter of the holes, and if the applied power to the circuitry included in the sides (e.g., the side 140a and the side 140c) of the enclosure 134 is increased.

In some implementations, the enclosure 134 can include circuitry that can be a thin film transistor (TFT) array of dots or pixels that can be individually controlled to produce an electric field across the enclosure 134. The enclosure 134 can included the circuitry that can be laminated to (affixed to) a surface of the enclosure 134. The TFT array of pixels can be charged accordingly to create an electric field that can sweep or move the positively charged black particles 142 from one side of the two-sided display section 108 to another side of the two-sided display section 108.

Figure 4:
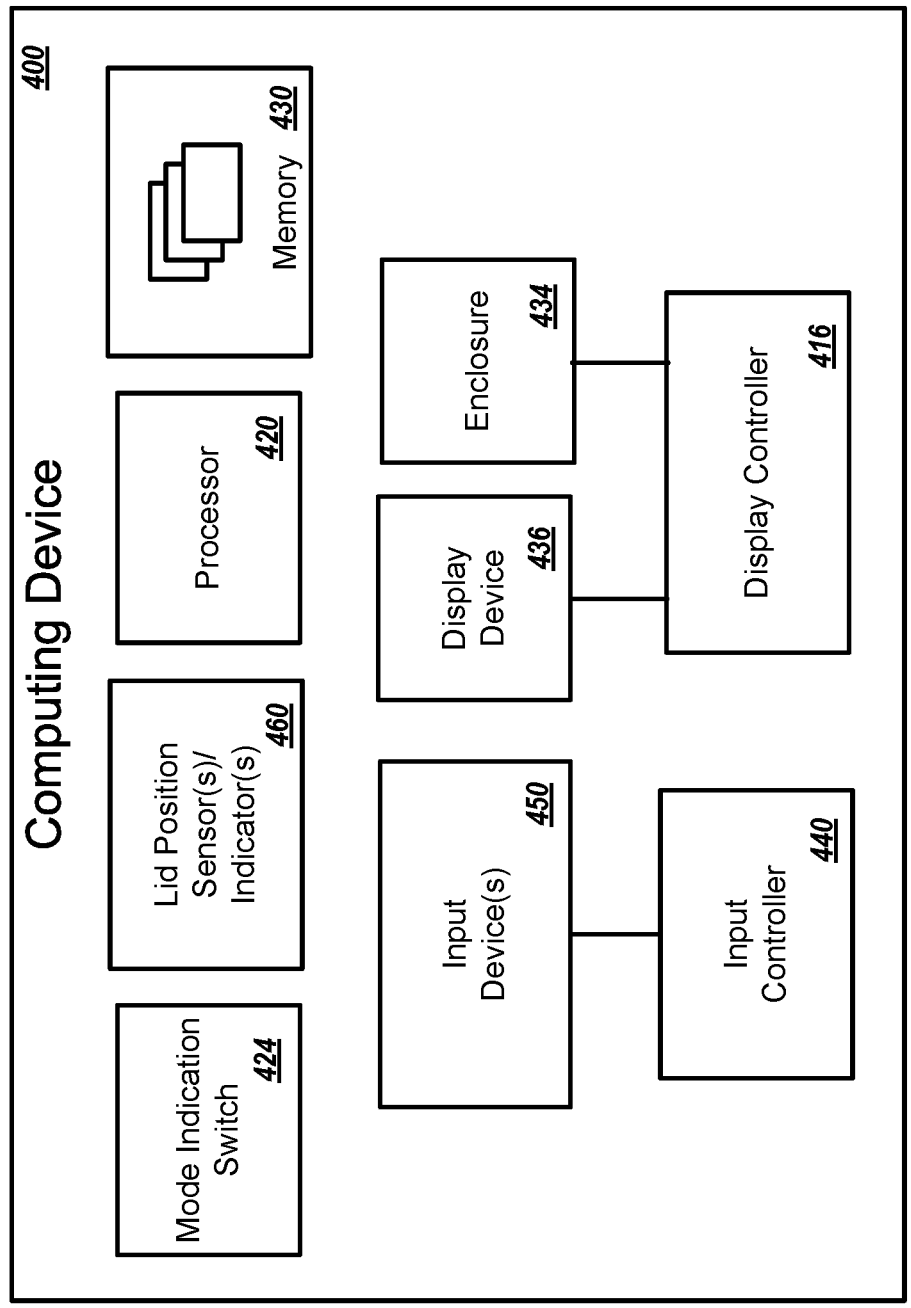
FIG. 4 is a block diagram illustrating example modules included in a computing device.

FIG. 4 is a block diagram illustrating example modules included in a computing device 400. For example, the computing device 400 can be the computing device 102, as shown in FIGS. 1A-G. In the example of FIG. 4, the computing device 400 includes a processor 420, memory 430, an input controller 440 and a display controller 416. The display controller 416 is operatively coupled/connected to and interfaces with a display device 436. The display controller 416 is operatively coupled/connected to and interfaces with an enclosure 434. For example, the display device 436 can be the two-way display device 136 as shown in FIGS. 1C, 1F, and 1G. For example, the enclosure 434 can be the enclosure 134 as shown in FIGS. 1C, 1F, 1G 2A-G, and 3A-B.

The input controller 440 can receive input data from one or more input devices 450. The input devices 450 can be one or more input devices a user of the computing device 400 may interact with, for example, to provide input to an application running on the computing device 400. For example, the processor 420 may execute an application that may be stored in the memory 430. The application can display a user interface on the display device 436 included in the computing device 400.

The user can interact with one or more of the input devices 450 (e.g., included in the input area 110) in order to interact with and/or provide input to the application. The input devices 450 can include, but are not limited to, a keyboard (e.g., keyboard 112), a trackpad (e.g., trackpad 114), a pointing device (e.g., pointer button 116), and mouse buttons (e.g., mouse buttons 118a-d). In some implementations, the display device 436 can be a two-way display device (e.g., two-way display device 136) and can be implemented according to any of the herein described implementations.

As described with reference to FIGS. 1A-G, 2A-G, and 3A-B, the display controller 416 can provide control signals to the display device 436 to control the rendering of content on the display device 436. The display controller 416 can provide control signals to circuitry included in the enclosure 434 to move particles suspended in a fluid contained in the enclosure 434 as described herein.

One or more lid position sensors/indicators 460 can provide the computing device 400 with an indication of the position of a lid of the computing device (e.g., the lid portion 104) with respect to the base of the computing device (e.g., the base portion 106). The lid position sensors/indicators 460 can include but are not limited to inductive, capacitive, mechanical, magneto-resistive, Hall effect, and optical sensors.

The lid position sensors/indicators 460 can include an accelerometer placed/located in the lid portion 104 of the computing device 102 and an accelerometer placed/located in the base portion 106 of the computing device 102 that can be used to determine an angle of the lid portion 104 with respect to the base portion 106 of the computing device 102. The determined angle can be indicative of the operating mode of the computing device 102.

In some implementations, the lid position sensors/indicators 460 can include a sensor/indicator that provides the computing device 102 with an indication that the computing device 102 is to be used in a tablet mode of operation. As described, a user of the computing device 102 can use the computing device 102 in a tablet mode when the computing device 102 is in a closed position, as shown in FIGS. 1D and 1E. A mode indication switch 424 (e.g., the mode indication switch 124) can provide an indication (e.g., a confirmation) that the user intends to use the computing device 102 as a tablet and that the user did not just close the computing device 102 with no further intention of continuing to use the computing device 102. In some implementations, as described with reference to FIGS. 1D and 1E, a user of the computing device 102 can press the mode indication switch 424 any time after closing the computing device 102 if the user intends to use the computing device 102 in a tablet mode of operation.

FIG. 5 is a flowchart that illustrates a method 500 of operating a computing device (e.g., the computing device 102) that includes a two-sided display section (e.g., the two-sided display section 108). In some implementations, the systems, methods, and processes described herein can implement the method 500. For example, the method 500 can be described referring to FIGS. 1A-G, 2A-H, 3A-B, and FIG. 4.

A positive charge is applied to a plurality of capacitors included in a first vertical bar of a plurality of vertical bars included in a layer of circuitry disposed on a surface of an enclosure that surrounds a display device (block 502). For example, referring to FIG. 2C, a positive charge is applied to the plurality of capacitors included in the vertical bar 202a. A negative charge is applied to a plurality of capacitors included in a second vertical bar of the plurality of vertical bars (block 504). The second vertical bar can be located adjacent to the first vertical bar. For example, referring to FIG. 2C, a negative charge is applied to the plurality of capacitors included in the vertical bar 202b. A negative charge is applied to a plurality of capacitors included in a third vertical bar of the plurality of vertical bars (block 506). The third vertical bar can be located adjacent to the first vertical bar. For example, referring to FIG. 2C, a negative charge is applied to the plurality of capacitors included in the vertical bar 202c.

A first subset of a plurality of particles suspended in a fluid included in the enclosure are moved away from the first vertical bar and towards the second vertical bar (block 508). A second subset of the plurality of particles are moved away from the first vertical bar and towards the third vertical bar (block 510). For example, as shown in FIG. 2C, applying a positive charge to the column of capacitors included in the vertical bar 202a repels (pushes, sweeps) positively charged particles in the proximity of the vertical bar 202a away from the column of capacitors included in the vertical bar 202a. In addition, applying a negative charge to the column of capacitors included in the vertical bar 202b and the vertical bar 202c can attract (pull, gather) the positively charged particles that are being repelled.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

A number of implementations have been described. Nevertheless, it will be understood that various modifications may be made without departing from the spirit and scope of the herein described implementations.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
   a base; and
   a lid coupled to the base, the lid housing a display section including a first side and a second side, the display section including:
      a display device having a first side and a second side, the first side of the display device being located on the first side of the display section and the second side of the display device being located on the second side of the display section; and
      an enclosure surrounding the display device, the enclosure including:
         a fluid;
         a plurality of particles suspended in the fluid; and
         a layer of circuitry disposed on a surface of the enclosure, the computing device being configured to control movement of the particles within the fluid by applying an electric field to the layer of circuitry.

2. The computing device of claim 1, wherein the layer of circuity includes a plurality of capacitors arranged in a plurality of vertical bars.

3. The computing device of claim 2,
   wherein the plurality of particles include a plurality of positively charged opaque particles,
   wherein the plurality of capacitors included in a vertical bar are configured to repel the plurality of charged opaque particles when a positive charge is applied to the plurality of capacitors, and
   wherein the plurality of capacitors included in a vertical bar are configured to attract the plurality of charged opaque particles when a negative charge is applied to the plurality of capacitors.

4. The computing device of claim 3, wherein the plurality of positively charged opaque particles include a plurality of positively charged black particles.

5. The computing device of claim 4, wherein controlling movement of the particles within the fluid by applying the electric field to the layer of circuitry includes:
   applying a positive charge to a plurality of capacitors included in each of a plurality of first vertical bars; and
   applying a negative charge to a plurality of capacitors included in each of a plurality of second vertical bars.

6. The computing device of claim 5, wherein the plurality of positively charged black particles are moved from the first side of the display section to the second side of the display section based on the applied positive charge and the applied negative charge.

7. The computing device of claim 6, wherein content rendered on the first side of the display device is configured for viewing from the first side of the display section.

8. The computing device of claim 7, wherein the second side of the display section is opaque.

9. The computing device of claim 8,
   wherein the plurality of positively charged black particles are composed of a reflective material, and
   wherein the plurality of positively charged black particles reflect ambient light back through the display device, the reflecting increasing a perceived brightness of the content rendered on the first side of the display device.

10. The computing device of claim 1,
    wherein the lid further includes a bezel surrounding a perimeter of the lid; and
    wherein the enclosure further includes:
       a first channel being located at a first edge of the display device and within the bezel; and
       a second channel being located at a second edge of the display device and within the bezel, the second edge of the display device being opposite to the first edge of the display device.

11. The computing device of claim 10, wherein controlling movement of the particles within the fluid by applying the electric field to the layer of circuitry includes controlling the movement of the plurality of particles into the first channel and the second channel.

12. A method comprising:
    applying a positive charge to a plurality of capacitors included in a first vertical bar of a plurality of vertical bars included in a layer of circuitry disposed on a surface of an enclosure that surrounds a display device;
    applying a negative charge to a plurality of capacitors included in a second vertical bar of the plurality of vertical bars, the second vertical bar located adjacent to the first vertical bar;
    applying a negative charge to a plurality of capacitors included in a third vertical bar of the plurality of vertical bars, the third vertical bar located adjacent to the first vertical bar;
    moving a first subset of a plurality of particles suspended in a fluid included in the enclosure away from the first vertical bar and towards the second vertical bar; and
    moving a second subset of the plurality of particles away from the first vertical bar and towards the third vertical bar.

13. The method of claim 12,
    wherein the plurality of particles include a plurality of positively charged black particles,
    wherein moving the first subset of the plurality of particles away from the first vertical bar and towards the second vertical bar includes:
       repelling, by the plurality of capacitors included in the first vertical bar, the first subset of the plurality of positively charged black particles; and
       attracting, by the plurality of capacitors included in the second vertical bar, the first subset of the plurality of positively charged black particles; and
    wherein moving the second subset of the plurality of particles away from the first vertical bar and towards the third vertical bar includes:
       repelling, by the plurality of capacitors included in the first vertical bar, the second subset of the plurality of positively charged black particles; and
       attracting, by the plurality of capacitors included in the third vertical bar, the second subset of the plurality of positively charged black particles.

14. The method of claim 12,
    wherein the negative charge is applied to the plurality of capacitors included in the second vertical bar of the plurality of vertical bars while the positive charge is applied to the plurality of capacitors included in the first vertical bar, and wherein the negative charge is applied to the plurality of capacitors included in the third vertical bar of the plurality of vertical bars while the positive charge is applied to a plurality of capacitors included in the first vertical bar.

15. The method of claim 12, further comprising:
applying a positive charge to the plurality of capacitors included in the first vertical bar, the second vertical bar, and the third vertical bar;
applying a negative charge to a plurality of capacitors included in a fourth vertical bar of the plurality of vertical bars, the fourth vertical bar located adjacent to the second vertical bar;
applying a negative charge to a plurality of capacitors included in a fifth vertical bar of the plurality of vertical bars, the fifth vertical bar located adjacent to the third vertical bar;
moving the first subset of the plurality of particles away from the first vertical bar and the second vertical bar towards the fourth vertical bar; and
moving the second subset of the plurality of particles away from the first vertical bar and the third vertical bar towards the fifth vertical bar.

16. The method of claim 15,
wherein moving the first subset of the plurality of particles further includes moving the first subset of the plurality of particles from a first side of the enclosure to a second side of the enclosure, and
wherein moving the second subset of the plurality of particles further includes moving the second subset of the plurality of particles from a first side of the enclosure to a second side of the enclosure.

17. The method of claim 16,
wherein the plurality of particles include a plurality of positively charged black particles; and
wherein the method further comprises:
rendering content on a first side of a display device included in the enclosure, the rendered content being viewable through the first side of the enclosure; and
providing an opaque background for the content rendered on the display device, the opaque background including the plurality of positively charged black particles.

18. The method of claim 17,
wherein the plurality of positively charged black particles are composed of a reflective material, and
wherein the plurality of positively charged black particles included in the opaque background reflect ambient light back through the display device, the reflecting increasing a perceived brightness of the content rendered on the first side of the display device.

19. A non-transitory, machine-readable medium having instructions stored thereon, the instructions, when executed by a processor, cause a computing device to:
apply, by the computing device, a positive charge to a plurality of capacitors included in a first vertical bar of a plurality of vertical bars included in a layer of circuitry disposed on a surface of an enclosure that surrounds a display device;
apply a negative charge to a plurality of capacitors included in a second vertical bar of the plurality of vertical bars, the second vertical bar located adjacent to the first vertical bar;
apply a negative charge to a plurality of capacitors included in a third vertical bar of the plurality of vertical bars, the third vertical bar located adjacent to the first vertical bar;
move a first subset of a plurality of particles suspended in a fluid included in the enclosure away from the first vertical bar and towards the second vertical bar; and
move a second subset of the plurality of particles away from the first vertical bar and towards the third vertical bar.

20. The medium of claim 19,
wherein moving the first subset of the plurality of particles further includes moving the first subset of the plurality of particles into a first channel located at a first edge of the enclosure, and
wherein moving the second subset of the plurality of particles further includes moving the second subset of the plurality of particles into a second channel located at a second edge of the enclosure, the second edge of the enclosure being opposite to the first edge of the enclosure.

* * * * *